United States Patent [19]

Terada et al.

[11] Patent Number: 5,511,866
[45] Date of Patent: Apr. 30, 1996

[54] ANTI-SKID CONTROL SYSTEM FOR AN ELECTRICALLY OPERATED VEHICLE

[75] Inventors: Michitaka Terada, Anjo; Masamoto Ando, Toyota; Toshiyuki Sakai, Kariya, all of Japan

[73] Assignee: Aisin Seiki Kabushiki Kaisha, Kariya, Japan

[21] Appl. No.: 253,260

[22] Filed: Jun. 2, 1994

[30] Foreign Application Priority Data

Jun. 4, 1993 [JP] Japan ..................... 5-134617

[51] Int. Cl.⁶ ............................................. B60L 7/18
[52] U.S. Cl. ........................... 303/152; 303/3; 303/15
[58] Field of Search .................... 303/100, 110, 303/3, 15, 20, 152, 112; 180/65.1–65.8, 165; 364/426.02

[56] References Cited

U.S. PATENT DOCUMENTS

| 4,671,577 | 5/1987 | Woods | 303/100 |
| 4,962,969 | 10/1990 | Davis | 303/3 |
| 5,148,883 | 9/1992 | Tanaka et al. | 180/65.8 |
| 5,358,317 | 10/1994 | Cikanek | 303/100 |

FOREIGN PATENT DOCUMENTS

| 48-2515 | 1/1973 | Japan . |
| 1-198201 | 8/1989 | Japan . |
| 2-120165 | 5/1990 | Japan . |

*Primary Examiner*—Matthew C. Graham
*Attorney, Agent, or Firm*—Burns, Doane, Swecker & Mathis

[57] ABSTRACT

The invention is directed to an anti-skid control system for an electrically operated vehicle having an electric motor and a regenerative braking system. The system sets a desired decreasing wheel speed, when a skid detector detects a skidding condition of the wheel in response to the output signal of a wheel speed detector. A controller controls a regenerative braking torque of the electric motor in accordance with a control mode selected from a torque control mode, in which the regenerative braking torque is provided in proportion to operation of a brake operating member, and a rotation control mode, in which the regenerative braking torque is controlled to rotate the electric motor at a predetermined speed corresponding to the desired decreasing wheel speed. The controller changes the torque control mode to the rotation control mode when the skid detector detects the skidding condition.

6 Claims, 5 Drawing Sheets

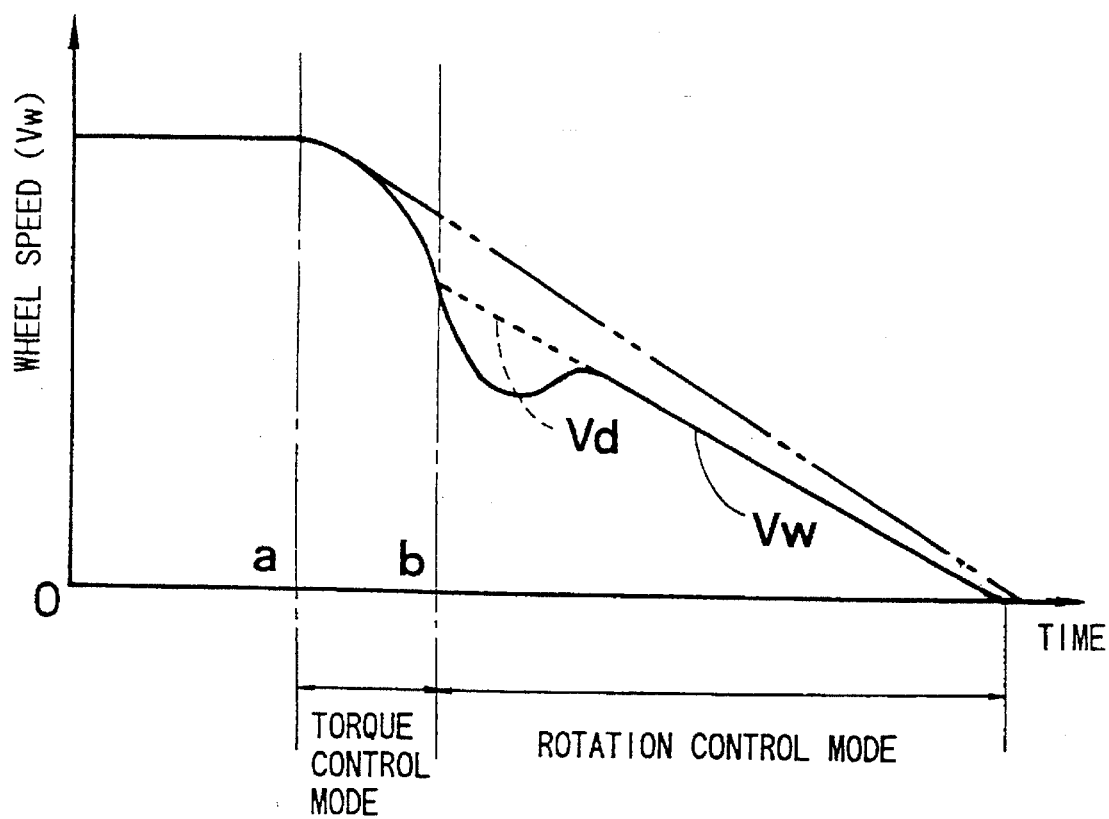

1

ANTI-SKID CONTROL SYSTEM FOR AN ELECTRICALLY OPERATED VEHICLE

BACKGROUND OF THE INVENTION

1. Field of the Invention

The present invention relates to an anti-skid control system for an electrically operated vehicle having an electric motor operating as a generator to provide a regenerative torque for braking and to recover the braking energy by charging a battery, and more particularly to an anti-skid control system for controlling the regenerative torque in braking operation of the vehicle to prevent the vehicle's wheels from being locked.

2. Description of the Prior Art

In general, an electrically operated vehicle is provided with a regenerative braking system, in which rotational energy of the vehicle's wheel is transformed into electric energy and recovered by charging the battery, so as to extend a travel distance of the vehicle. The electrically operated vehicle is also provided with an anti-skid braking system for controlling the braking force applied to the vehicle's wheels to prevent the wheels from being locked, as disclosed in Japanese Patent Laid-open Publication No. 48-2515, for example.

In that publication, there is disclosed a system in which a switch (either mechanical switch or semiconductor) is turned off to block electric current fed to a regenerative braking control circuit when the skidding condition of a wheel is detected, so that the regenerative braking torque applied to the wheel is released to thereby prevent the wheel from skidding. Then, when the speed or acceleration of the wheel is increased to reach a certain value, the aforementioned switch is turned on to apply the regenerative braking torque to the wheel. In the case where the skidding condition of the wheel is detected again, the switch is turned off to release the regenerative braking torque applied to the wheel. With these operations repeated, the wheel is prevented from skidding.

In the above-described system, however, application of the regenerative braking torque to the wheel is intermitted in accordance with the on-off operation of the switch to thereby control the braking force applied to the wheel. That is, the regenerative braking torque is applied to the wheel immediately after the switch is turned on, whereas no regenerative braking torque is applied when the switch is turned off. Therefore, the magnitude of the braking force applied to the wheel is largely varied by intermitting the application of the regenerative braking torque to the wheel, so that it is difficult to stop the vehicle smoothly in case of the anti-skid operation.

SUMMARY OF THE INVENTION

Accordingly, it is an object of the present invention to provide an anti-skid control system for an electrically operated vehicle with a regenerative braking system, which may perform a smooth anti-skid control operation by appropriately controlling the regenerative braking torque.

In accomplishing the above and other objects, an anti-skid control system for an electrically operated vehicle having an electric motor which is operatively connected to a wheel of the vehicle and a regenerative braking system which is connected to the electric motor. The anti-skid control system is provided with a wheel speed detector which detects a wheel speed of the wheel, and a skid detector which detects a skidding condition of the wheel in response to the output signal of the wheel speed detector. The system sets a desired decreasing wheel speed when the skid detector detects the skidding condition of the wheel. A controller is provided for controlling a regenerative braking torque of the electric motor in accordance with a control mode selected from a torque control mode in which the regenerative braking torque is provided in proportion to operation of a brake operating member, and a rotation control mode in which the regenerative braking torque is controlled to rotate the electric motor at a predetermined speed corresponding to the desired decreasing wheel speed. The controller changes the torque control mode to the rotation control mode when the skid detector detects the skidding condition.

In the above-described anti-skid control system, preferably another detector may be provided for detecting a rotating speed of the electric motor, and the controller may enable the rotation control mode to provide the regenerative braking torque in accordance with the relationship between the regenerative braking torque and an absolute value of a difference between the rotating speed of the electric motor and the desired decreasing wheel speed.

BRIEF DESCRIPTION OF THE DRAWINGS

The above stated objects and following description will become readily apparent with reference to the accompanying drawings, wherein like reference numerals denote like elements, and in which:

FIG. 5 is a graph showing the operation of the anti-skid control according to an embodiment of the present invention.

DESCRIPTION OF THE PREFERRED EMBODIMENT

Figure 1:
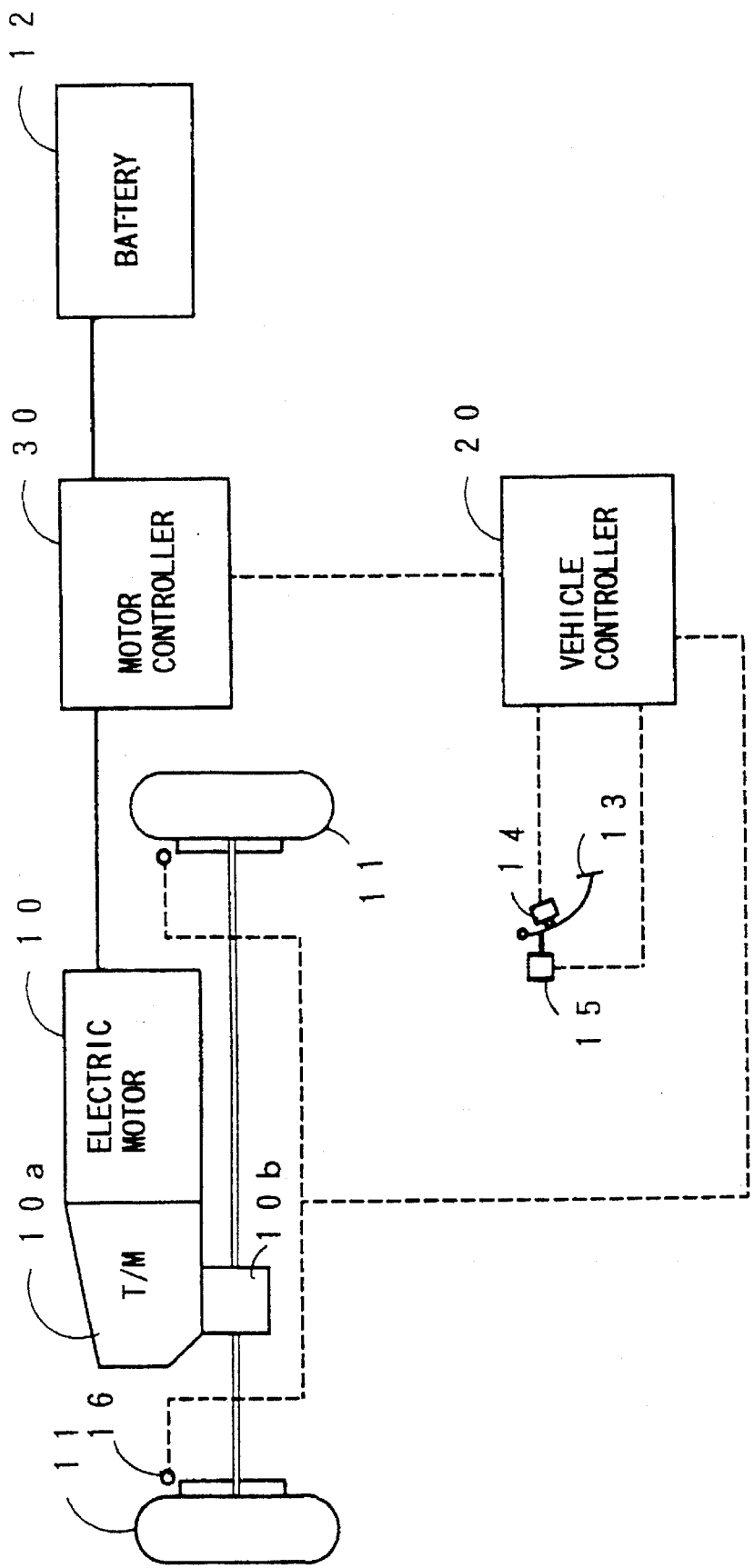
FIG. 1 is a general block diagram illustrating an anti-skid control system according to the present invention.
Figure 2:
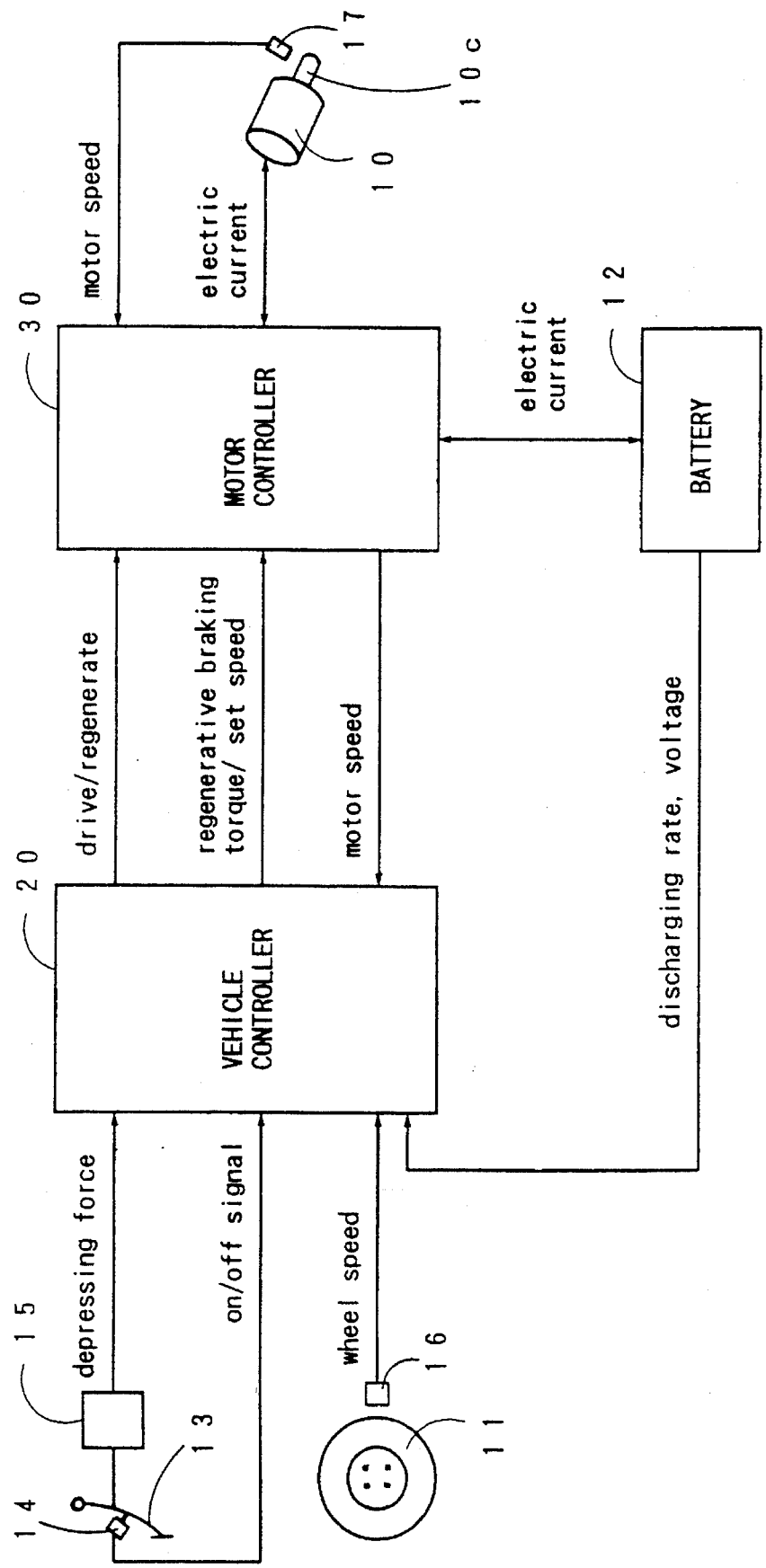
FIG. 2 is a schematic block diagram of an anti-skid control system of an embodiment of the present invention.

Referring to FIGS. 1 and 2, there is schematically illustrated an anti-skid control system according to the present invention, which controls a braking force applied to wheels 11, 11. An electric motor 10 is connected to a battery 12 and operatively connected to the wheels 11, 11, through a known transmission 10a and a differential gear 10b. The electric motor 10 may drive (or rotate) a rotating shaft 10c as shown in FIG. 2 with electric power fed from the battery 12, or may recover electric power, which is produced by the electric motor 10 operating as a generator in response to rotation of the rotating shaft 10c driven by the wheels 11, 11 (hereinafter, referred to as the wheel 11), by charging the battery 12.

A motor controller 30 is provided for actuating the electric motor 10 to drive the wheel 11, i.e., to perform a driving operation, or to operate as a generator, i.e., to perform a regenerative braking operation in accordance with a switching signal discharged from a vehicle controller 20 which serves for detecting a skidding condition of the wheel 11, and setting a desired decreasing wheel speed, and serves for other functions in connection with the vehicle's operation. The vehicle controller 20 is connected to a brake pedal switch 14 which turns on or off in response to depression of a brake pedal 13 which serves as a brake operating member. The controller 20 is also connected to a depressing force sensor 15 which detects the depressing force applied to the brake pedal 13, a wheel speed sensor 16 which detects rotating speed of the wheel 11. The vehicle controller 20 further inputs signals indicative of the discharging rate and voltage of the battery 12, and the rotating speed signal of the electric motor 10 fed from the motor controller 30. In response to the above-described data fed into the vehicle controller 20, the vehicle controller 20 may switch the operation of the electric motor 10 between its driving operation and regenerative braking operation, set a driving torque and a regenerative braking torque to be produced by the electric motor 10, and also provide a set speed of rotation for a rotation control mode of the electric motor 10, which mode will be described later.

The motor controller 30 causes the electric motor 10 to produce the driving torque and the regenerative braking torque in accordance with a control signal fed from the vehicle controller 20. For a feed back control provided in the operation by the motor controller 30, the rotating speed of the electric motor 10 is required, which is obtained such that a position of the rotating shaft 10c is detected by an encoder 17 continuously, then fed to the motor controller 30 and also fed to the vehicle controller 20 as described before. In lieu of the encoder 17, the wheel speed sensor 16 may be employed as a detector for detecting the rotating speed of the electric motor 10, in the case where the rotating shaft 10c of the electric motor 10 is directly connected to a rotating shaft of the wheel 11.

Figure 3:
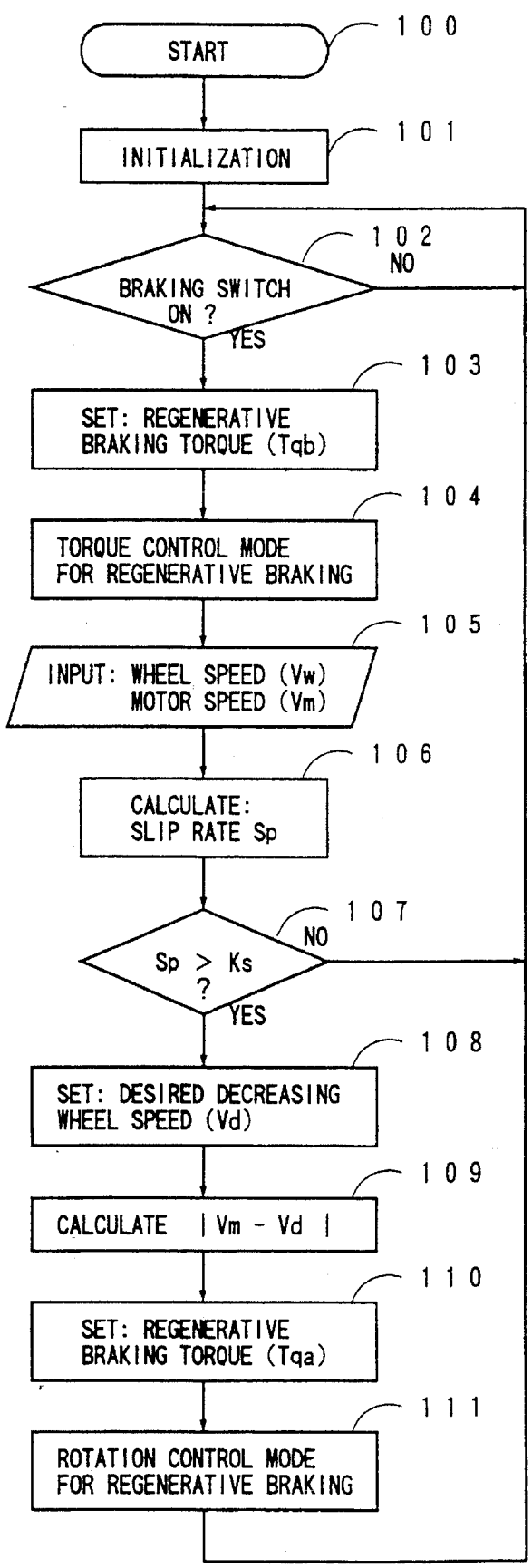
FIG. 3 is a flowchart showing the operation of the anti-skid control by the controller according to an embodiment of the present invention.

In operation, when a driver in the vehicle operates a start switch (not shown), the vehicle controller 20 and motor controller 30 are fed with electric current to start their operation at Step 100 in FIG. 3, then provide initialization of the system at Step 101 to clear various data stored in the controllers 20, 30. To effect braking, the brake pedal 13 is depressed by the driver, to turn on the brake pedal switch 14. When it is determined that the switch 14 is turned on at Step 102, the vehicle controller 20 sets a regenerative braking torque (Tqb) in proportion to the depressing force (or stroke) of the brake pedal 13 at Step 103, and sends a signal indicative of the torque (Tqb) to the motor controller 30, which causes the electric motor 10 to produce the regenerative braking torque in response to the torque (Tqb) set at Step 103. Thus, a torque control mode for regenerative braking is performed at Step 104.

During this operation, the motor controller 30 inputs the rotating speed (Vm) of the electric motor 10 and the vehicle controller 20 inputs the wheel speed (Vw) at Step 105, as described before. In the vehicle controller 20, therefore, a slip rate Sp can be calculated from the wheel speed (Vw) and an estimated vehicle speed (Vs) which is estimated on the basis of the wheel speed (Vw). The slip rate Sp is calculated at Step 106 according to the following formula:

$$Sp=(Vs-Vw)/Vs \qquad (1)$$

where

Vs represents the estimated vehicle speed and Vw represents the wheel speed obtained as a tire peripheral speed.

At Step 107, the slip rate Sp is compared with a predetermined value Ks. When the slip rate Sp is less than the predetermined value Ks, the flowchart returns to Step 102. However, if the vehicle is running on a frozen snowed road or the like of a low coefficient of friction, for example, and an excessive braking force is applied to the wheel 11 to cause the wheel 11 to slip on the road surface, and as a result the slip rate Sp exceeds the predetermined value Ks, then the vehicle controller 20 sets a desired decreasing wheel speed (Vd) at Step 108 as follows:

$$Vd=Vs(1-Sp) \qquad (2)$$

where

Vs represents the estimated vehicle speed, and Sp represents the slip rate.

Accordingly, the rotating speed of the electric motor 10 corresponding to the desired decreasing wheel speed (Vd) is determined and fed to the motor controller 30.

Figure 4:
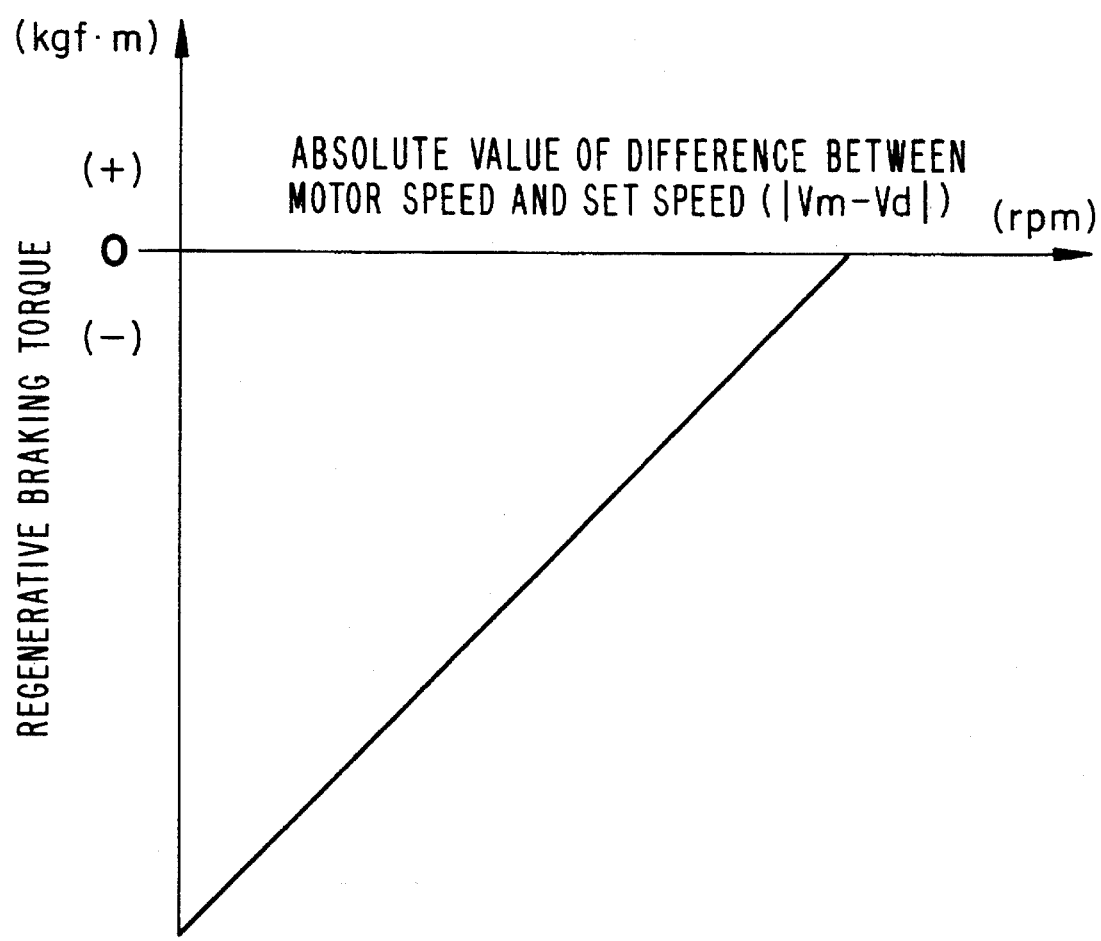
FIG. 4 is a graph showing the variation of regenerative braking torque applied to a wheel in case of the rotation control mode for regenerative braking.

In the motor controller 30, calculated at Step 109 is an absolute value of the difference between the rotating speed (Vm) of the electric motor 10 and the desired decreasing wheel speed (Vd), i.e., |Vm−Vd|. Then, at Step 110, a regenerative braking torque (Tqa) is set in response to the absolute value |Vm−Vd| according to a graph as shown in FIG. 4. Consequently, arotation control mode for regenerative braking is performed at Step 111.

FIG. 5 illustrates the variation of the wheel speed (Vw) and a vehicle speed according to the present embodiment. In FIG. 5, a solid line indicates the actual wheel speed (Vw), a phantom line indicates the desired decreasing wheel speed (Vd), and a two-dotted chain line indicates an actual vehicle speed. When the vehicle is braked at a position "a" in FIG. 5, the regenerative braking is initiated with the torque control mode, so that the wheel speed (Vw) is reduced gradually. In the case where the anti-skid control is initiated at a position "b", the desired decreasing wheel speed (Vd) is set in the vehicle controller 20 as indicated by the phantom line in FIG. 5, while the actual wheel speed (Vw) is continued to be reduced as indicated by the solid line for a short period. The regenerative braking according to the present embodiment is changed from the torque control mode to the rotation control mode when the anti-skid control is initiated. Therefore, the wheel speed (Vw) is controlled to overtake the desired decreasing wheel speed as shown in the solid line in FIG. 5.

As the brake pedal 13 is released, the regenerative braking will be terminated, and the vehicle controller 20 and motor controller 30 in turn will cause the electric motor 10 to provide a rotation torque in response to depression of an accelerator pedal (not shown) in a conventional manner.

According to the present embodiment, when the vehicle is in the skidding condition, it is so arranged that the vehicle controller 20 causes the motor controller 30 to change the torque control mode to the rotation control mode for the regenerative braking of the electric motor 10, and the motor controller 30 directly controls the electric motor 10. However, the vehicle controller 20 may cause the motor controller 30 to provide either of the regenerative braking modes for the electric motor 10 continuously, while the vehicle controller 20 detects the rotating speed of the electric motor 10.

In the vehicle controller 20 according to the present embodiment, the skidding condition of the wheel 11 is detected when the slip rate Sp exceeds the predetermined value Ks. However, the skidding condition of the wheel 11 may be detected by comparing the desired decreasing wheel speed and the output of the wheel sensor 16.

With respect to the battery 12, when its charging rate is close to its upper limit, the regenerative braking torque will be insufficient. When its discharging rate is not enough to supply sufficient electric power, the vehicle may not be driven. To avoid these, the vehicle controller 20 is always monitoring the discharging rate and voltage of the battery 12, according to the present embodiment. In parallel with the battery 12, a capacitor (not shown) may be provided as a power source in the present embodiment, to improve the response characteristic of the electric motor 10. Although only regenerative braking system has been described in the above-described apparatus, a conventional hydraulic braking system may be employed in parallel with the regenerative braking system.

What is claimed is:

1. An anti-skid control system for an electrically operated vehicle having an electric motor operatively connected to a wheel of said vehicle and a regenerative braking system connected to said electric motor, comprising;

wheel speed detection means for detecting a wheel speed of said wheel;

skid detection means for detecting a skidding condition of said wheel in response to said output signal of said wheel speed detection means;

means for setting a desired decreasing wheel speed when said skid detection means detects the skidding condition of said wheel; and control means for controlling a regenerative braking torque of said electric motor in accordance with a control mode selected from a torque control mode for providing the regenerative braking torque in proportion to operation of a brake operating member, and a rotation control mode for controlling the regenerative braking torque to rotate said electric motor at a predetermined speed corresponding to the desired decreasing wheel speed, said control means changing said torque control mode to said rotation control mode when said skid detection means detects the skidding condition.

2. An anti-skid control system as claimed in claim 1, further comprising means for detecting a rotating speed of said electric motor, said control means enabling the rotation control mode to provide the regenerative braking torque in accordance with the relationship between the regenerative braking torque and an absolute value of a difference between the rotating speed of said electric motor and the desired decreasing wheel speed.

3. An anti-skid control system as claimed in claim 1 or 2, wherein said skid detection means comprises means for calculating a slip rate of said wheel from the wheel speed detected by said wheel speed detection means and comparing the slip rate with a predetermined value to determine the skidding condition.

4. An anti-skid control system for an electrically operated vehicle having an electric motor operatively connected to a wheel of said vehicle and a regenerative braking system connected to said electric motor, comprising;

a wheel speed detector for detecting a wheel speed of said wheel;

a vehicle controller including skid detection means for detecting a skidding condition of said wheel in response to said output signal of said wheel speed detector, and means for setting a desired decreasing wheel speed when said skid detection means detects the skidding condition of said wheel;

a motor controller connected to said vehicle controller for controlling a regenerative braking torque of said electric motor in accordance with a control mode selected from a torque control mode for providing the regenerative braking torque in proportion to operation of a brake operating member, and a rotation control mode for controlling the regenerative braking torque to rotate said electric motor at a predetermined speed corresponding to the desired decreasing wheel speed, said vehicle controller controlling said motor controller to change said torque control mode to said rotation control mode when said skid detection means detects the skidding condition.

5. An anti-skid control system as claimed in claim 4, further comprising means for detecting a rotating speed of said electric motor, said motor controller enabling the rotation control mode to provide the regenerative braking torque in accordance with the relationship between the regenerative braking torque and an absolute value of a difference between the rotating speed of said electric motor and the desired decreasing wheel speed.

6. An anti-skid control system as claimed in claim 4 or 5, wherein said skid detection means comprises means for calculating a slip rate of said wheel from the wheel speed detected by said wheel speed detector and comparing the slip rate with a predetermined value to determine the skidding condition.

\* \* \* \* \*